(12) United States Patent
Hwang et al.

(10) Patent No.: US 10,549,771 B2
(45) Date of Patent: Feb. 4, 2020

(54) STEERING APPARATUS FOR STEER-BY-WIRE SYSTEM

(71) Applicants: HYUNDAI MOTOR COMPANY, Seoul (KR); KIA MOTORS CORPORATION, Seoul (KR)

(72) Inventors: Sang Woo Hwang, Seoul (KR); Hyeon Seok Cho, Pyeongtaek-si (KR); Byung Rim Lee, Seongnam-si (KR); Young Dae Park, Asan-si (KR); Min Jun Kim, Busan (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 126 days.

(21) Appl. No.: 15/808,123

(22) Filed: Nov. 9, 2017

(65) Prior Publication Data

US 2019/0016370 A1    Jan. 17, 2019

(30) Foreign Application Priority Data

Jul. 12, 2017    (KR) .................. 10-2017-0088210

(51) Int. Cl.
*B62D 5/04*    (2006.01)
*B62D 5/00*    (2006.01)
*G01B 7/30*    (2006.01)
*B62D 15/02*    (2006.01)

(52) U.S. Cl.
CPC ............ *B62D 5/001* (2013.01); *B62D 5/008* (2013.01); *B62D 15/021* (2013.01); *G01B 7/30* (2013.01); *B62D 5/0469* (2013.01)

(58) Field of Classification Search
CPC ...... B62D 5/001; B62D 5/008; B62D 15/021; B62D 15/0215; B62D 5/0469; G01B 7/30; G01D 5/145
See application file for complete search history.

(56) References Cited

U.S. PATENT DOCUMENTS 6,598,695 B1 *  7/2003  Menjak .................. B62D 5/001
                                                           180/402
8,066,092 B2 * 11/2011  Shimizu .................... B62D 1/16
                                                           180/443

(Continued)

FOREIGN PATENT DOCUMENTS

KR    10-2004-0017349 A    2/2004

*Primary Examiner* — Kevin Hurley
*Assistant Examiner* — Marlon A Arce
(74) *Attorney, Agent, or Firm* — Morgan, Lewis & Bockius LLP

(57) ABSTRACT

A steering apparatus for a steer-by-were system includes a driving member rotating in conjunction with a steering wheel and having a first stopper protruding from the driving member; a change gear receiving rotational force from the driving member, changing a rotational speed, and outputting a changed rotational speed; and a driven member receiving the rotational force output from the change gear, rotating at a rotational speed different from that of the driving member, and having a second stopper, which protrudes from the driven member, disposed within a rotation radius of the first stopper. The second stopper comes into contact with the first stopper at a predetermined steering angle during rotation of the driving member.

9 Claims, 5 Drawing Sheets

(56) References Cited

U.S. PATENT DOCUMENTS

| | | | | |
|---|---|---|---|---|
| 8,813,901 B2* | 8/2014 | Tashiro | .................. | B62D 5/003 |
| | | | | 180/402 |
| 2004/0262071 A1* | 12/2004 | Duits | ..................... | B62D 5/005 |
| | | | | 180/402 |
| 2017/0282962 A1* | 10/2017 | Sekikawa | ................ | B62D 3/12 |

* cited by examiner

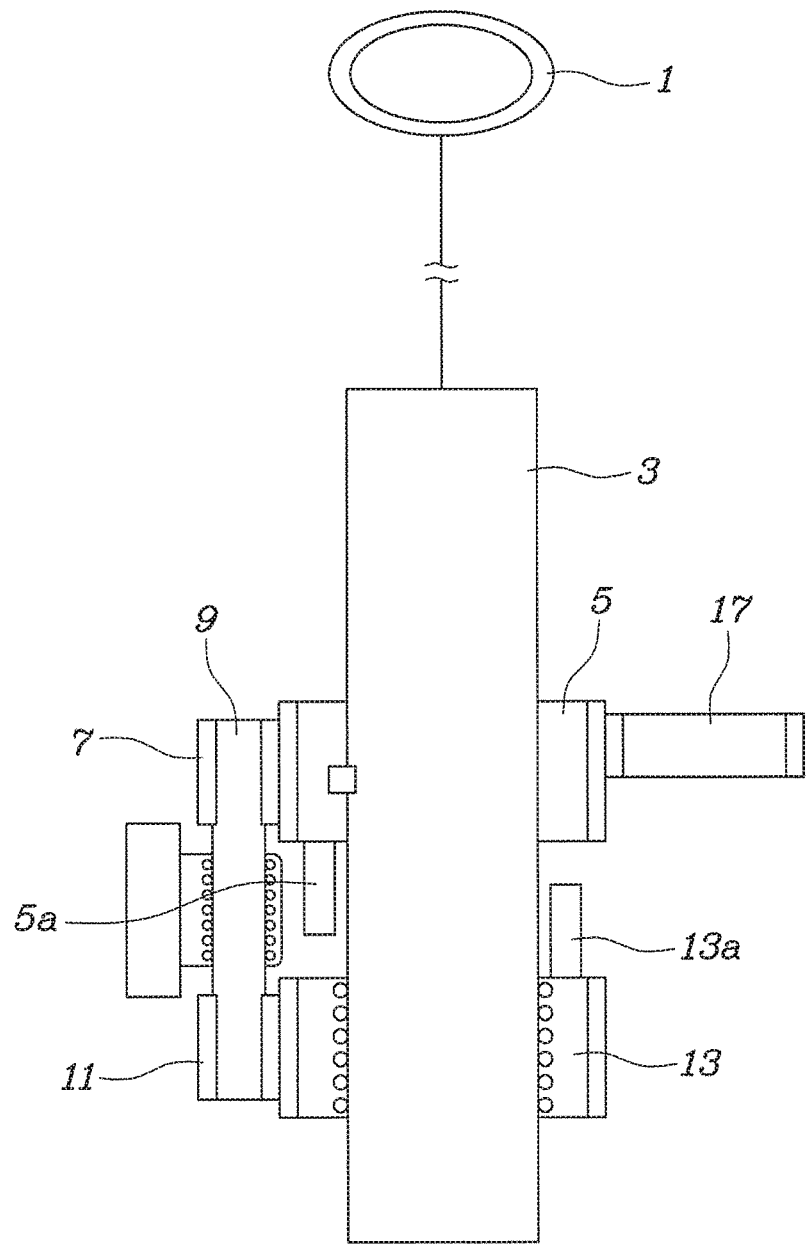
[FIG.1]

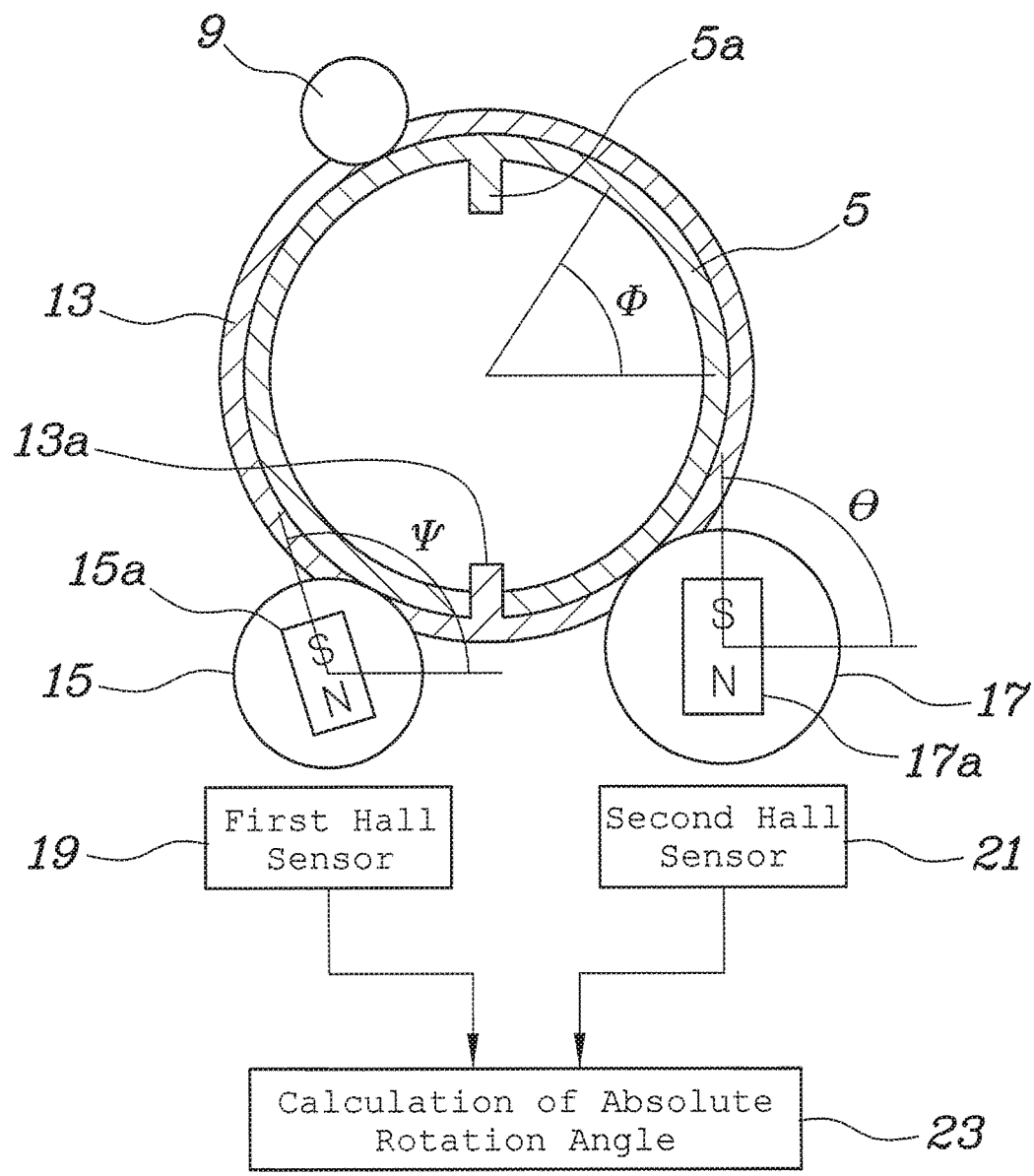
[Fig. 2]

[Fig. 3]
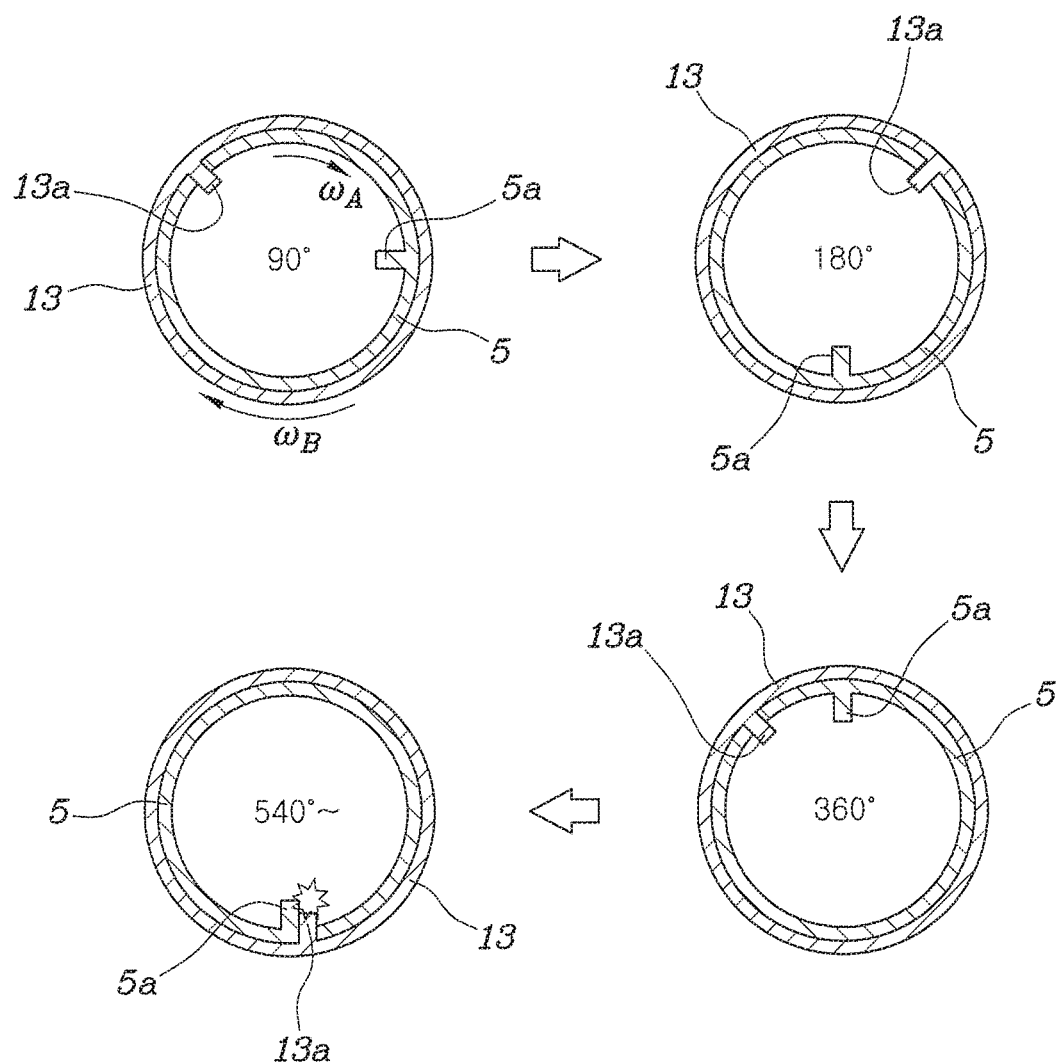

[Fig. 4]
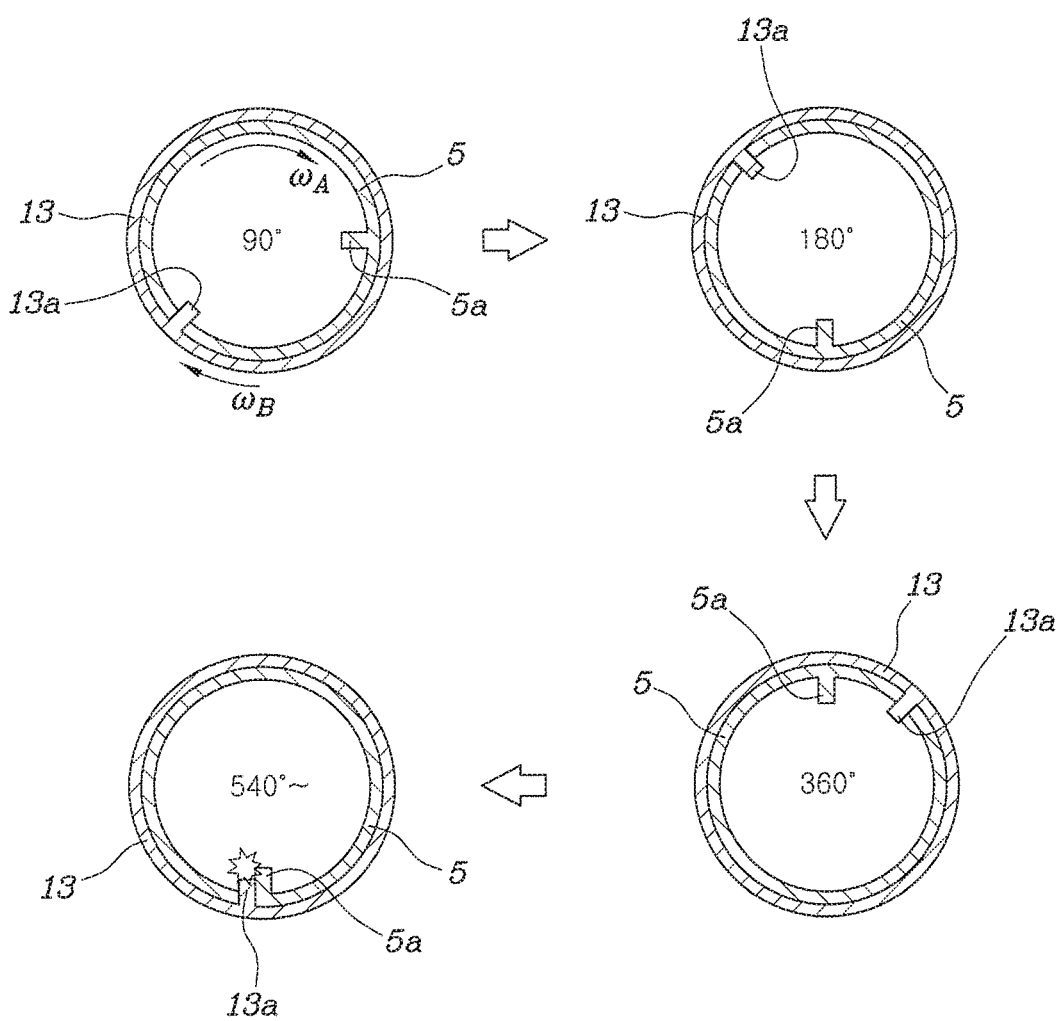

[Fig. 5]
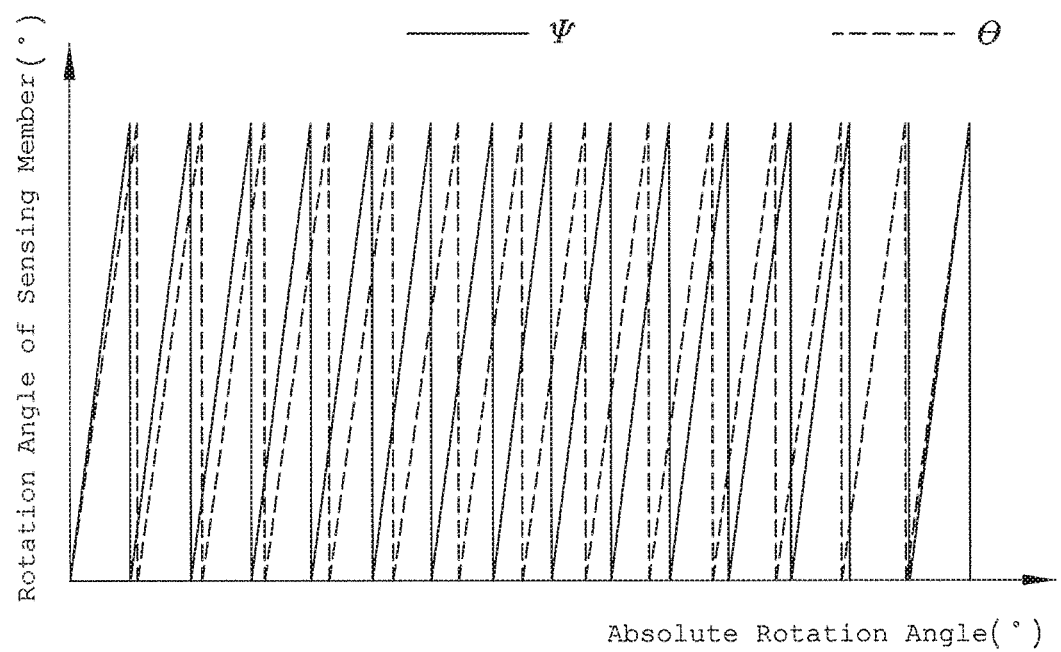

STEERING APPARATUS FOR STEER-BY-WIRE SYSTEM

CROSS REFERENCE TO RELATED APPLICATION

The present application claims the benefit of priority to Korean Patent Application No. 10-2017-0088210, filed Jul. 12, 2017, the entire content of which is incorporated herein for all purposes by this reference.

TECHNICAL FIELD

The present disclosure relates to a steering apparatus for a steer-by-wire system, more particularly, a steering apparatus for a steer-by-wire system limiting a maximum steering angle of a steering wheel by using a gear ratio difference between two rotary parts that rotate in conjunction with a column.

BACKGROUND

A steer-by-wire system is a steering system that eliminates mechanical linkages between the steering wheel and the driving wheels of a vehicle. This steering system receives a steering wheel rotation signal via an electronic control unit (ECU) and operates a steering motor connected to the driving wheels in accordance with the steering wheel rotation signal, thereby steering the vehicle.

Since steer-by-wire systems eliminate mechanical linkages which are usually provided in conventional steering systems, the steer-by-wire systems provide many advantages such as increasing layout flexibility in configuration of a steering system, improving fuel efficiency, eliminating disturbances transmitted from wheels, etc.

Steer-by-wire systems also have a disadvantage that the proper steering feedback information cannot be provided to a driver, due to mechanical disconnections between a steering wheel and driving wheels.

For example, conventional steering systems need not generate steering wheel reaction torque because they have mechanical linkages such as a universal joint or the like, but steer-by-wire systems need to generate steering wheel reaction torque or restoring reaction torque using a motor or the like because they do not have mechanical linkages.

In addition, conventionally, when tires (i.e. wheels) cannot rotate any further beyond a rotation angle limit, a steering wheel can further rotate. Therefore, it is necessary to restrict the rotation of the steering wheel of a vehicle.

Therefore, regarding the steer-by-wire system, a technology for limiting the maximum rotation angle of a steering wheel is required, and various mechanisms that can mechanically limit the maximum rotation angle of a steering wheel have been recently suggested.

However, existing steer-by-wire systems still have a problem that space utilization efficiency is low because a rotation restriction mechanism and a steering wheel reaction torque generation mechanism are separately provided.

The foregoing is intended merely to aid in the understanding of the background of the present disclosure, and is not intended to mean that the present disclosure falls within the purview of the related art that is already known to those skilled in the art.

SUMMARY

The present disclosure has been made keeping in mind the above problems occurring in the prior art, and an objective of the present disclosure is to provide a steering apparatus for a steer-by-wire system, the apparatus limiting the maximum steering angle of a steering wheel by using a gear ratio difference between two rotary parts rotating in conjunction with a column.

In order to accomplish the above objective, the present disclosure provides a steering apparatus for a steer-by-wire system, the steering apparatus including: a driving member rotating in conjunction with rotation of a steering wheel and having a first stopper protruding from the driving member; a change gear receiving rotational force from the driving member, changing a rotational speed, and outputting a changed rotational speed; and a driven member receiving the rotational force output from the change gear, rotating at a rotational speed different from that of the driving member, and having a second stopper, which protrudes from the driven member, disposed within a rotation radius of the first stopper. The second stopper comes into contact with the first stopper at a predetermined steering angle during rotation of the driving member.

The change gear may include: a first connection member meshed with the driving member with a first gear ratio and rotating in conjunction with the driving member; and a second connection member meshed with the driven member with a second gear ratio different from the first gear ratio and rotating in conjunction with the first connection member.

The driving member may be fixedly fitted over a column; the driven member may be rotatably fitted over the column, the driven member performing a relative rotation with respect to the column; a connection shaft may be rotatably installed on one side of the column; the first connection member and the second connection member may be fixed to respective ends of the connection shaft; and the first connection member and the second connection may be respectively connected to the driving member and the driven member by being externally meshed with the driving member and the driven member, respectively.

The driving member, the driven member, the first connection member, and the second connection member may be respectively gears.

The first stopper may be arranged to face the driven member; the second stopper may be arranged to face the driving member; and the first stopper and the second stopper may be rotated with an equal rotation radius.

The first stopper and the second stopper may be arranged respectively on opposite sides with respect to a shaft of the column when the steering wheel stays at a steering angle neutral position.

The steering apparatus may further include: a first sensing member rotating together with the driving member by being meshed with the driving member with a predetermined gear ratio, and having a first magnet installed such that a position of a magnetic field changes depending on a direction of rotation of the first sensing member; a second sensing member rotating together with the driven member by being meshed with the driven member with a predetermined gear ratio different from that of the first sensing member and the driving member, and having a second magnet installed such that a position of a magnetic field changes depending on a direction of rotation of the second sensing member; a first fall sensor detecting a change in the position of the magnetic field in accordance with the rotation of the first sensing member; a second hall sensor detecting a change in the position of the magnetic field in accordance with the rotation of the second sensing member; and a controller calculating an absolute rotation angle using signals transmitted from the first hall sensor and the second hall sensor.

The first sensing member and the second sensing member may be connected to the driving member by being externally meshed with the driving member.

The steering apparatus according to the present disclosure creates a rotational speed difference between two stoppers that rotate in the same direction in conjunction with a column, thereby restricting the rotation of the stoppers at a specific steering angle. The steering apparatus can mechanically limit the maximum steering angle of a steering wheel in this manner. In addition, since a steering angle limiting structure is designed to have a compact size, space utilization efficiency of a steer-by-wire system employing the steering apparatus is improved, and merchantability of the vehicle is accordingly improved.

In addition, since the steering apparatus calculates the absolute rotation angle of the steering wheel using a rotational speed difference between two gears that rotate at different speeds during the rotation of the column, the steering apparatus can be used as a steering angle sensor for detecting the angle of the steering wheel.

BRIEF DESCRIPTION OF THE DRAWINGS

The above and other objects, features and other advantages of the present disclosure will be more clearly understood from the following detailed description when taken in conjunction with the accompanying drawings, in which:

FIG. 1 is a diagram illustrating the structure of a steering apparatus according to one embodiment of the present disclosure to describe rotary motion of a driving member and a driven member of the steering apparatus;

FIG. 2 is a diagram illustrating the principles and structure of an absolute rotation angle calculation mechanism of the steering apparatus according to one embodiment of the present disclosure;

FIG. 3 is a diagram illustrating an operation of limiting a steering angle in the structure in which the driven member rotates at a rotational speed faster than that of the driving member;

FIG. 4 is a diagram illustrating an operation of limiting a steering angle in the structure in which the driving member rotates at a rotational speed faster than that of the driven member; and FIG. 5 is a diagram illustrating changes in magnetic field in accordance with a rotational speed difference between a first sensing member and a second sensing member.

DETAILED DESCRIPTION

Hereinbelow, exemplary embodiments of the present disclosure will be described in detail with reference to the accompanying drawings.

According to one embodiment of the present disclosure, a steering apparatus for a steer-by-wire system includes a driving member 5, a change gear, and a driven member 13.

Referring to FIGS. 1 and 2, the driving member 5 rotates in conjunction with a steering wheel 1, and includes a first stopper 5a protruding inward from the inside surface thereof.

The change gear receives rotational force transmitted from the driving member 5, changes a rotational speed transmitted from the driving member 5, and outputs a change rotational speed.

The driven member 13 receives the rotational force output from the change gear, and rotates in the same direction as the driving member 5 at a rotational speed different from that of the driving member 5. A second stopper 13a is disposed within the rotation radius of the first stopper 5a. The second stopper 13a protrudes inward from the inside surface of the driven member 13. When the driving member 5 rotates, the second stopper 13a restricts the rotation of the steering wheel 1 by coming into contact with the first stopper 5a at a specific steering angle of the steering wheel 1.

That is, according to the structure described above, when the steering wheel 1 is rotated leftward or rightward from a steering angle neutral position, the driving member 5 also rotates in conjunction with the steering wheel 1.

Then, the driven member 13 also rotates in conjunction with the driving member 5. In this case, the driven member 13 rotates at a rotational speed faster or slower than that of the driving member 5, depending on the difference between the input rotational speed and the output rotational speed of the change gear.

For example, when the driven member 13 rotates at a rotational speed faster than that of the driving member 5, the second stopper 13a of the driven member 13 rotates faster than the first stopper 5a of the driving member 5 and gradually becomes closer to the first stopper 5a.

Thus, when the steering wheel 1 is rotated by a specific steering angle (for example, 540°) from the steering angle neutral position, the second stopper 13a may catch up and comes into contact with the first stopper 5a. Thus, the rotary motion of the first stopper 5a and the second stopper 13a is restricted and the rotary motion of the driving member 5 and the steering wheel 1 is accordingly restricted.

To this end, the change gear includes a first connection member 7 and a second connection member 11, and generates a rotational speed difference between the driving member 5 and the driven member 13 by using a gear ratio difference between a gear ratio of the driving member 5 and the first connection member 7 and a gear ratio of the driven member 13 and the second connection member 11.

Specifically, the first connection member 7 and the driving member 5 rotate with a predetermined gear ratio.

The second connection member 11 and the first connection member 7 rotate in conjunction with each other. The second connection member 11 may be meshed with the driven member 13 with a gear ratio different from that of the driving member 5 and the first connection member 7. The driving member 5 and the first connection member 7 are connected to each other by being externally meshed with each other. The driven member 13 and the second connection member 11 are also connected to each other by being externally meshed with each other.

For example, when the driving member 5 and the first connection member 7 are externally meshed with each other with a gear ratio of 3:9, the driven member 13 and the second connection member 11 may be externally meshed with each other with a gear ratio of 4:9.

As another example, when the driving member 5 and the first connection member 7 are externally meshed with a gear ratio of 3:9, the driven member 13 and the second connection member 11 may be externally meshed with each other with a gear ratio of 2:9.

The structure of the steering apparatus according to the present disclosure will be described in greater detail below. The driving member 5 is fixedly fitted over a column 3 connected to a lower end of the steering wheel 1. The driving member 5 and the column 3 rotate in conjunction with each other.

The driven member 13 is rotatably fitted over the column 3. The driven member 13 is rotatable relative with respect to the column 3. To this end, the driven member 13 is supported on the column 3 via bearings.

A connection shaft 9 is disposed next to the column 3 and is rotatable with respect to a vehicle body. The first connection member 7 is fixed to an end (hereinafter, referred to as a first end) of the connection shaft 9. The first connection member 7 is externally meshed with the driving member 5. The second connection member 11 is fixed to the other end (hereinafter, referred to as a second end) of the connection shaft 9. The second connection member 11 is externally meshed with the driven member 13.

That is, when the column 3 rotates in conjunction with the steering wheel 1, the driving member 5 accordingly rotates, and the first connection member 7 meshed with the driving member 5 also rotates. Accordingly, the second connection member 11 rotates in conjunction with the first connection member 7, which causes the driven member 13 meshed with the second connection member 11 to rotate. In this case, due to a difference between the gear ratio of the driving member 5 and the first connection member 7 and the gear ratio of the second connection member 11 and the driven member 13, the driven member 13 and the driving member 5 rotate at different rotational speeds.

The first stopper 5a is arranged to face the driven member 13, and the second stopper 13a is arranged to face the driving member 5. The first stopper 5a and the second stopper 13a have an equal rotation radius, so that the first stopper 5a and the second stopper 13a come into contact with each other during rotations of the driving member and the driven member.

When the steering wheel 1 is maintained at the steering angle neutral position, the first stopper 5a and the second stopper 13a are arranged respectively on opposite sides with respect to a shaft of the column 3, i.e. arranged to have an angular phase of 180° with respect to each other.

With this structure, in any case in which the steering wheel 1 is rotated leftward or rightward from the steering angle neutral position, the first stopper 5a and the second stopper 13a come into contact with each other at a specific angle position, thereby restricting the rotation of the steering wheel 1, in which the specific angle position may be a position rotated leftward by an angle of 540° from the steering angle neutral position or a position rotated rightward by an angle of 540° from the steering angle neutral position.

In addition, according to the present disclosure, it is possible to calculate an absolute rotation angle by using the rotational speed difference attributable to the gear ratio difference. Therefore, the steering apparatus according to the present disclosure can be used as a steering angle sensor, thereby obtaining a steering angle of the steering wheel.

To this end, the steering apparatus according to the present disclosure may further include a first sensing member 15, a second sensing member 17, a first hall sensor 19, a second hall sensor 21, and a controller 23.

Referring to FIGS. 2 and 5, the first sensing member 15 rotates in a state in which the driving member 5 and the first sensing member 15 are meshed with a predetermined gear ratio. In this case, the driving member 5 and the first sensing member 15 are externally meshed with each other.

The first sensing member 15 may be equipped with a magnet 15a installed such that the position of a magnetic field changes depending on the direction of rotation of the first sensing member 15.

The second sensing member 17 rotates in a state in which the driving member 5 and the second sensing member 17 are meshed with a predetermined gear ratio. The driving member 5 and the second sensing member 17 are meshed with each other with a gear ratio different from the gear ratio of the driving member 5 and the first sensing member 15. The driving member 5 and the second sensing member 17 are also externally meshed with each other.

The second sensing member 17 may be equipped with a magnet 17a installed such that the position of a magnetic field changes depending on the direction of rotation of the second sensing member 17.

The first hall sensor 19 is installed near the magnet 15a of the first sensing member 15 whereby the first hall sensor 19 detects a change in the position of the magnetic field in accordance with the rotation of the first sensing member 15. The second hall sensor 21 is installed near the magnet 17a of the second sensing member 17 whereby the second all sensor 21 detects a change in the position of the magnetic field in accordance with the rotation of the second sensing member 17.

The controller 23 can calculate an absolute rotation angle of the steering wheel 1 using signals transmitted from the first hall sensor 19 and the second hall sensor 21.

That is, when the driving member 5 rotates, the first sensing member 15 and the second sensing member 17 rotate at different rotational speeds due to the difference between the gear ratio of the driving member 5 and the first sensing member 15 and the gear ratio of the driving member 5 and the second sensing member 17.

For this reason, a rotation angle at which the change in the position of the magnetic field is detected by the first sensing member 15, and a rotation angle at which the change in the position of the magnetic field is detected by the second sensing member 17 differ from each other. Therefore, the absolute rotation angle of the steering wheel 1 can be obtained by calculating a signal difference attributable to the difference between the rotation angles.

Hereinafter, the operation of the steering apparatus according to the present disclosure to limit a steering angle of the steering wheel 1 will be described.

FIG. 3 illustrates the structure of the steering apparatus designed such that the rotational speed ωB of the driven member 13 is faster than the rotational speed ωA of the driving member 5. The driving member 5 and the first connection member 7 are externally meshed with each other with a gear ratio of 3:9, and the driven member 13 and the second connection member 11 are externally meshed with each other with a gear ratio of 4:9. Thus, the steering apparatus according to the present disclosure is designed to limit the steering angle of the steering wheel to 540° in the case of either the leftward rotation or the rightward rotation from the steering angle neutral position. To this end, when the steering wheel is positioned at the steering angle neutral position, the first stopper 5a and the second stopper 13a are arranged to have an angular phase of 180° with respect to each other.

With the structure described above, when the steering wheel 1 is rotated (for example, rotated rightward) for steering of the vehicle, the driving member 5 rotates accordingly, and the driven member 13 also rotates in the same direction as the driving member 5 at a faster rotational speed than that of the driving member 5.

When the steering wheel 1 is rotated until the driving member 5 rotates by an angle of 540°, the driven member 13 rotates by an angle of 720° due to the gear ratio difference therebetween. At this time, the second stopper 13a comes into contact with the first stopper 5a.

That is, when the second stopper 13a is stopped by the first stopper 5a, since the second stopper 13a is designed to rotate at a faster speed than the first stopper 5a, the first stopper 5a cannot rotate any further. Therefore, the rotation of the driving member 5 is restricted, and the steering rotation of the steering wheel 1 is accordingly restricted.

FIG. 4 illustrates the structure designed such that the rotational speed ωA of the driving member 5 is faster than the rotational speed ωB of the driven member 13. In this structure, the driving member 5 and the first connection member 7 are externally meshed with each other with a gear ratio of 3:9, and the driven member 13 and the second connection member 11 are externally meshed with each other with a gear ratio of 2:9. In the case of either leftward steering or rightward steering from the steering angle neutral position, since the maximum steering angle is set to be limited to 540°, the first stopper 5a and the second stopper 13a are arranged to have an angular phase of 180° with respect to each other when the steering wheel is maintained at the steering angle neutral position.

With this structure, when the steering wheel 1 is rotated (for example, rotated rightward) for steering of the vehicle, the driving member 5 rotates accordingly, and the driven member 13 also rotates in the same direction as the driving member 5 at a rotational speed slower than that of the driving member 5.

When the steering rotation of the steering is continued until the driving member 5 rotates by an angle of 540°, the driven member 13 rotates by an angle of 360° due to the gear ratio difference. At this point, the first stopper 5a comes into contact with the second stopper 13a.

Therefore, when the first stopper 5a is stopped by the second stopper 13a, since the first stopper 5a is designed to rotate at a faster speed than the second stopper 13a, the first stopper 5a cannot rotate any further. Therefore, the rotation of the driving member 5 is restricted and the steering rotation of the steering wheel 1 is accordingly restricted.

As described above, the present disclosure causes two stoppers rotating in conjunction with the column 3 to rotate in the same direction at different rotational speeds by using a gear ratio difference, thereby restricting the rotation of the stoppers at a specific steering angle. In this manner, it is possible to mechanically limit the maximum steering angle of the steering wheel 1.

Furthermore, since this steering angle limiting mechanism is structured to have a compact size, space utilization efficiency of the steer-by-wire system is improved, and thus merchantability of the vehicle can be improved.

In addition, since it is possible to calculate the absolute rotation angle of the steering wheel 1 using a rotational speed difference between two gears rotating at different rotational speeds during the rotation of column 3, the steering apparatus according to the present disclosure can be used as a steering angle sensor for detecting the steering angle of the steering wheel 1.

Although an exemplary embodiment of the present disclosure has been described for illustrative purposes, those skilled in the art will appreciate that various modifications, additions and substitutions are possible, without departing from the scope and spirit of the invention as disclosed in the accompanying claims.

What is claimed is:

1. A steering apparatus for a steer-by-wire system, the steering apparatus comprising:
    a driving member rotating in conjunction with a steering wheel and having a first stopper protruding from the driving member;
    a change gear receiving rotational force from the driving member, changing a rotational speed, and outputting a changed rotational speed; and
    a driven member receiving the rotational force output from the change gear, rotating at a rotational speed different from that of the driving member, and having a second stopper, which protrudes from the driven member, disposed within a rotation radius of the first stopper,
    wherein the second stopper comes into contact with the first stopper at a predetermined steering angle during rotation of the driving member, and
    wherein the first stopper and the second stopper are disposed within a space defined between the driving member and the driven member with respect to a shaft of a column.

2. A steering apparatus for a steer-by-wire system, the steering apparatus comprising:
    a driving member rotating in conjunction with a steering wheel and having a first stopper protruding from the driving member;
    a change gear receiving rotational force from the driving member, changing a rotational speed, and outputting a changed rotational speed; and
    a driven member receiving the rotational force output from the change gear, rotating at a rotational speed different from that of the driving member, and having a second stopper, which protrudes from the driven member, disposed within a rotation radius of the first stopper,
    wherein the second stopper comes into contact with the first stopper at a predetermined steering angle during rotation of the driving member,
    wherein the change gear comprises:
        a first connection member meshed with the driving member with a first gear ratio and rotating in conjunction with the driving member; and
        a second connection member meshed with the driven member with a second gear ratio different from the first gear ratio and rotating in conjunction with the first connection member,
    wherein the driving member is fixedly fitted into a column,
    wherein the driven member is rotatably fitted into the column, the driven member performing a relative rotation with respect to the column,
    wherein a connection shaft is rotatably installed on one side of the column,
    wherein the first connection member and the second connection member are fixed to respective ends of the connection shaft, and
    wherein the first connection member and the second connection member are respectively externally meshed with the driving member and the driven member.

3. The steering apparatus according to claim 2, wherein the driving member, the driven member, the first connection member, and the second connection member are gears.

4. The steering apparatus according to claim 1, wherein the first stopper faces the driven member,
    the second stopper faces the driving member, and
    the first stopper and the second stopper rotate with an equal rotation radius.

5. The steering apparatus according to claim 1, further comprising:
    a first sensing member rotating in conjunction with the driving member by being meshed with the driving member with a predetermined gear ratio, and having a first magnet installed such that a position of a first magnetic field changes depending on a direction of rotation of the first sensing member;

a second sensing member rotating in conjunction with the driven member by being meshed with the driven member with a predetermined gear ratio different from that of the first sensing member and the driving member, and having a second magnet installed such that a position of a second magnetic field changes depending on a direction of rotation of the second sensing member;

a first fall sensor detecting a change in the position of the first magnetic field in accordance with the rotation of the first sensing member;

a second hall sensor detecting a change in the position of the second magnetic field in accordance with the rotation of the second sensing member; and a controller calculating an absolute rotation angle of the steering wheel using signals transmitted from the first hall sensor and the second hall sensor.

6. The steering apparatus according to claim 5, wherein the first sensing member and the second sensing member are connected to the driving member by being externally meshed with the driving member.

7. The steering apparatus according to claim 2, wherein the first stopper faces the driven member, the second stopper faces the driving member, and the first stopper and the second stopper rotate with an equal rotation radius.

8. A steering apparatus for a steer-by-wire system, the steering apparatus comprising:

a driving member rotating in conjunction with a steering wheel and having a first stopper protruding from the driving member;

a change gear receiving rotational force from the driving member, changing a rotational speed, and, outputting a changed rotational speed; and a driven member receiving the rotational force output from the change gear, rotating at a rotational speed different from that of the driving member, and having a second stopper, which protrudes from the driven member, disposed within a rotation radius of the first stopper, wherein the second stopper comes into contact with the first stopper at a predetermined steering angle during rotation of the driving member, wherein the first stopper and the second stopper are arranged respectively on opposite sides with respect to a shaft of a column when the steering wheel stays at a steering angle neutral position.

9. The steering apparatus according to claim 8, wherein the first stopper faces the driven member, the second stopper faces the driving member, and the first stopper and the second stopper rotate with an equal rotation radius.

* * * * *